Dec. 15, 1931.  J. H. MORECROFT  1,836,934
ELECTRICAL METER
Filed Dec. 24, 1930
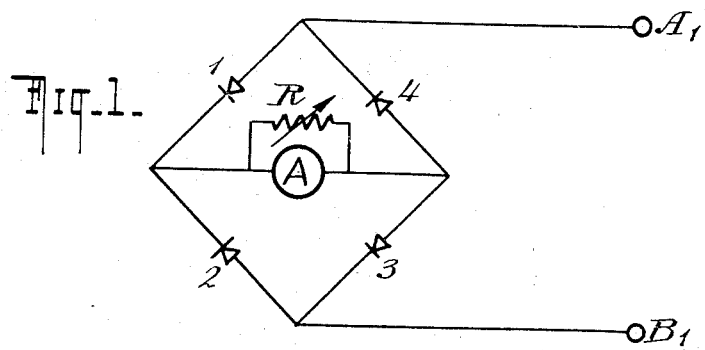
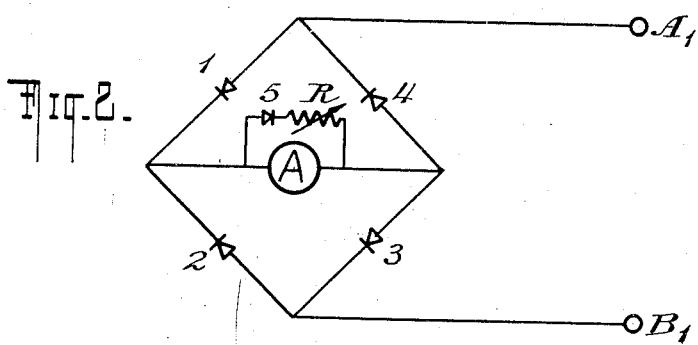
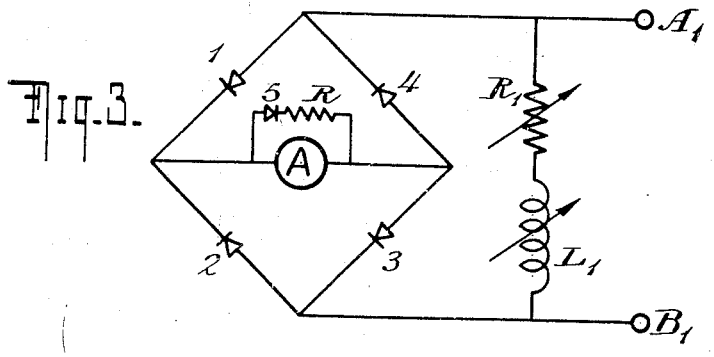
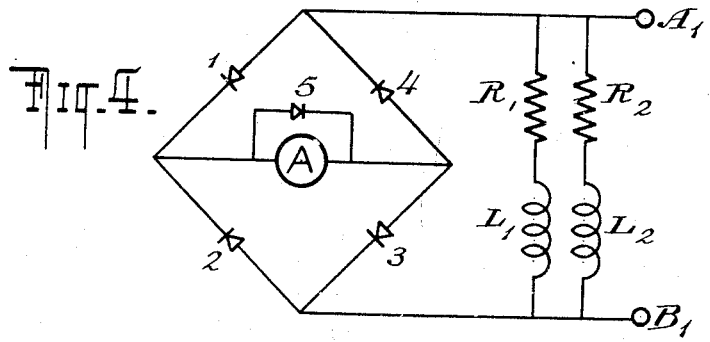

Patented Dec. 15, 1931

1,836,934

UNITED STATES PATENT OFFICE

JOHN H. MORECROFT, OF PALISADE, NEW JERSEY

ELECTRICAL METER

Application filed December 24, 1930. Serial No. 504,608.

This invention relates to the improvement of certain types of alternating current meters.

An alternating current meter, which has recently come into use, employs in combination a bridge of rectifying elements with a sensitive direct current meter of the permanent magnet-moving coil type. A meter so constructed is subject to great errors in calibration, however, when the frequency of the circuit in which it is being used, differs appreciably from the frequency at which the meter was calibrated by the maker. In actual tests, a special meter of the class referred to, having been calibrated at low frequency, required .0004 ampere at low frequency to make it deflect to full scale reading. It was also found that as the frequency increased it required more and more current to make the meter deflect to full scale. At 10 kilocycles, for example, it required .00044 amperes; at 50 kilocycles, it required .00065 amperes and at 100 kilocycles, it required .00094 amperes. Thus the meter at 100 kilocycles indicates less than one-half of the current flowing through it.

As alternating current meters of this kind are found much more rugged and sensitive than the thermo couple type, which has heretofore been used for measuring small alternating currents or voltages, it is the purpose of the present invention to improve its construction and operation so that it can be used on circuits of various frequencies without being subject to objectionable errors.

Various circuit arrangements suitable for carrying my invention into effect are illustrated in the accompanying drawings, but I do not wish to be understood as intending to limit myself to the same, as various changes may be made therein without departing from the spirit and scope of the invention.

In the drawings—

Fig. 1 shows one form of the rectifier type of meter in which 1, 2, 3 and 4 are rectifiers and A is a sensitive direct current meter. The terminals of the meter are shown at $A_1$—$B_1$. The variable resistance R, shunting the direct current meter A, constitutes one form of my improvement.

In Fig. 2, I have shown shunting the direct current meter, a rectifier element 5 and a variable resistance R; in Fig. 3, I have shown a rectifier 5 and resistance R, shunting the direct current meter and a shunt path across the meter terminals consisting of the variable resistance $R_1$ in series with the variable inductance $L_1$; in Fig. 4, I have shown a rectifier 5 shunting the direct current meter A, and two inductive paths across the terminals of the meter.

Referring now to the drawings, the bridge of rectifiers 1, 2, 3 and 4, with the direct current meter A, is the combination at present available and to eliminate error from the readings of such a meter, I connect a variable resistance R, across the direct current meter A, as shown in Fig. 1, and by suitably adjusting the value of this resistance, the meter can be made to read accurately at any desired frequency, at any point on the scale. I have also found, however, that the value of resistance required to make the meter read accurately at any given frequency is different for different scale settings, so that this expedient for making the meter reading correct is difficult to adjust.

In Fig. 2, I have shown in shunt with the direct current meter A, a circuit made up of the variable resistance R and a rectifier unit 5. This rectifier unit has a resistance which varies with the voltage impressed upon it, and possibly also with the frequency. This arrangement, with a proper rectifier unit, will hold the calibration correct over a considerable frequency range.

In Fig. 3, I have shown in shunt with the direct current meter the rectifier 5 in series with resistance R, and, in addition, I have shown a circuit made up of $R_1$ and $L_1$, in shunt with the meter terminals. By using the proper values of $R_1$ and $L_1$, a very great improvement in the meter performance is produced. The proper values of $R_1$ and $L_1$ depend, among other things, upon the size and type of rectifiers 1, 2, 3 and 4.

In Fig. 4, I have shown the arrangement which I have found most satisfactory. There is no extra resistance used in series with the rectifier 5, which shunts the direct current meter A. In shunt with the terminals $A_1$—$B_1$, of the meter A, there are shown two circuits consisting of resistance and inductance. I have found that this arrangement will result in a calibration which is practically correct over the entire frequency range as high as 100 kilocycles.

The two shunt circuits, $R_1$—$L_1$, and $R_2$—$L_2$, must have the proper time constants if they are to function properly. For the type of meter I have tested, using small copper oxide rectifiers at 1, 2, 3 and 4, I have used a somewhat larger copper oxide rectifier at 5, and have found that suitable values of the shunt circuit resulted when $R_1 = 1000$ ohms, $L_1 = .00114$ henries, and when $R_2 = 10000$ ohms and $L_2 = .0011$ henries.

It will be understood that these values are representative only, to enable those skilled in the art to test the invention. For different constructions of the meter to be corrected, different values of these electrical quantities will be required.

Whereas I have shown only two paths in shunt with the meter terminals, I do not wish to be understood as intending to limit myself to this number. In general, when copper oxide rectifiers are used, the desirable number of circuits depends upon the width of the frequency band over which the meter is to be used, and upon the amount of deviation from one hundred percent accuracy permissible.

The rectifying qualities of the copper oxide rectifiers used at present depends to a considerable degree upon their temperature, the efficiency of rectification generally decreasing at the higher temperatures.

By using suitable materials for constructing the shunt circuits, it is possible to offset to some extent this temperature error of the meter. As the efficiency of the rectifiers goes down, the amount of current taken by circuits $R_1$—$L_1$ and $R_2$—$L_2$, should correspondingly diminish—in other words, their shunt paths should increase their resistance suitably as the current through them increases.

It is also possible to make the path shunting the meter A have sufficient increase in resistance, with temperature increase, that the meter reads correctly in spite of the decreased rectifying qualities of rectifiers 1, 2, 3 and 4.

Having thus described my invention, what I claim is:

1. In an alternating current ammeter of the rectifier-direct current meter type, the combination of a variable impedance circuit across the coil of the direct current meter and a variable impedance circuit across the terminals of the alternating current ammeter, said circuits giving such variations in impedance with frequency changes, that the value of the direct current through said coil bears a substantially fixed proportion to the value of the alternating current flowing between the meter terminals, irrespective of the frequency of said alternating current.

2. In an alternating current meter of the rectifier-direct current meter type, an electrical circuit in parallel with the coil of the direct current meter, and another electrical circuit in parallel with the meter terminals, said circuits being so proportioned that the value of the average current through the coil of the direct current meter to the effective value of the current flowing between the meter terminals is substantially independent of the frequency of the alternating current.

JOHN H. MORECROFT.